United States Patent
Gentile et al.

(10) Patent No.: US 8,919,118 B2
(45) Date of Patent: Dec. 30, 2014

(54) MOTOR VEHICLE WITH TURBOCHARGER

(75) Inventors: Martin Gentile, Ruesselsheim-Koenigstaedten (DE); Gernot Becker, Mainz (DE); Thomas Stock, Nauheim (DE)

(73) Assignee: GM Global Technology Operations LLC, Detroit, MI (US)

(*) Notice: Subject to any disclaimer, the term of this patent is extended or adjusted under 35 U.S.C. 154(b) by 200 days.

(21) Appl. No.: 13/116,137

(22) Filed: May 26, 2011

(65) Prior Publication Data
US 2011/0289915 A1 Dec. 1, 2011

(30) Foreign Application Priority Data

May 26, 2010 (DE) .................. 10 2010 021 562

(51) Int. Cl.
*F02D 23/00* (2006.01)
*F02B 33/44* (2006.01)
*F02B 37/22* (2006.01)
*F02B 37/12* (2006.01)
*F02D 41/00* (2006.01)

(52) U.S. Cl.
CPC ........... *F02B 37/22* (2013.01); *F02B 2037/122* (2013.01); *Y02T 10/144* (2013.01); *F02D 41/0007* (2013.01)
USPC .......................... 60/602; 60/605.1

(58) Field of Classification Search
USPC .................. 60/600, 602, 605.1
See application file for complete search history.

(56) References Cited

U.S. PATENT DOCUMENTS

| | | | |
|---|---|---|---|
| 6,652,414 B1* | 11/2003 | Banks, III ................ 477/32 |
| 7,650,224 B2* | 1/2010 | Andrea et al. ................ 701/108 |
| 8,255,134 B2* | 8/2012 | O'Leary et al. ................ 701/64 |
| 2007/0111853 A1* | 5/2007 | King et al. ................ 477/109 |
| 2007/0161457 A1* | 7/2007 | Geywitz et al. ................ 477/107 |
| 2009/0157270 A1* | 6/2009 | Frauenkron et al. ........... 701/54 |
| 2009/0211229 A1* | 8/2009 | Andreae et al. ............... 60/274 |
| 2011/0034296 A1* | 2/2011 | Stervik ......................... 477/3 |
| 2011/0093174 A1* | 4/2011 | O'Leary et al. ............... 701/64 |
| 2011/0289915 A1* | 12/2011 | Gentile et al. ............... 60/605.1 |

FOREIGN PATENT DOCUMENTS

| | | |
|---|---|---|
| DE | 19955256 A1 | 3/2001 |
| GB | 2449166 A | 11/2008 |
| WO | 2009106275 A2 | 9/2009 |

* cited by examiner

*Primary Examiner* — Thai Ba Trieu
*Assistant Examiner* — Paolo Isada
(74) *Attorney, Agent, or Firm* — Ingrassia Fisher & Lorenz, P.C.

(57) ABSTRACT

A motor vehicle is provided having a combustion engine, an automatic transmission, a turbocharger with variable geometry pre-compressing combustion air for the combustion engine and a turbocharger control unit for varying the turbocharger geometry, the turbocharger control unit is equipped before a downshifting of the automatic transmission to vary the geometry in the turbocharger in the direction of a reduction of the rotational speed of the turbocharger.

20 Claims, 2 Drawing Sheets

MOTOR VEHICLE WITH TURBOCHARGER

CROSS-REFERENCE TO RELATED APPLICATION

This application claims priority to German Patent Application No. 102010021562.7, filed May 26, 2010, which is incorporated herein by reference in its entirety.

TECHNICAL FIELD

The technical field relates to a motor vehicle having a turbocharger with variable geometry and means for controlling such a turbocharger.

BACKGROUND

Turbochargers with variable geometry, in general with adjustable guide blades, allow varying the ratio between exhaust gas throughput and turbine rotational speed and in this manner also providing a good compression performance even at low engine rotational speed. In order to achieve a required compression performance it can be necessary to set the guide blades so that the turbine runs near a permissible maximum rotational speed although the exhaust gas throughput is still below its maximum. A sudden increase of the exhaust gas throughput, particularly in connection with a sudden rotational speed increase when down shifting a transmission of the motor vehicle can then lead to the maximum permissible rotational speed of the turbine and being exceeded and thus the turbocharger put at risk. Mainly motor vehicles with automatic transmissions or automated manual transmissions are controllable to allow for very rapid downshifting operations which can result in such limit value being exceeded.

The problem is particularly pronounced when using the vehicle in thin air, i.e. when travelling at great altitude in mountains, since the reduced air pressure reduces the air mass sucked in by the compressor of the turbocharger per revolution and, accordingly, the work performed by the compressor on the sucked-in air per revolution is also reduced, so that the turbocharger is delayed to a lesser degree than when travelling under high air pressure in lowlands.

At least one object is to state a motor vehicle with a turbocharger. The risk of exceeding the maximum permissible rotational speed of the turbocharger is eliminated or at least reduced. In addition, other objects, desirable features and characteristics will become apparent from the subsequent summary and detailed description, and the appended claims, taken in conjunction with the accompanying drawings and this background.

SUMMARY

A motor vehicle is provided having a combustion engine, an automatic transmission, a turbocharger with variable geometry pre-compressing combustion air for the combustion engine and a turbocharger control unit for varying the turbocharger geometry the turbocharger control unit is equipped to vary the geometry of the turbocharger in the direction of a reduction of the rotational speed of the turbocharger before a downshifting of the transmission.

So as not to unnecessarily restrict the performance of the turbocharger, the turbocharger control unit is preferentially equipped to monitor the rotational speed of the turbocharger and to vary the geometry in the direction of a reduction of the rotational speed only when it is above a rotational speed limit value during downshifting. This rotation speed limit value is generally lower than the maximum permissible rotational speed of the turbocharger. Since the danger of an unintentional rotational speed increase of the turbocharger during downshifting of the transmission is the greater the lower the ambient air pressure, it can be practical to predetermine the difference between the rotational speed limit value and the maximum permissible rotational speed as a function of the ambient air pressure.

In order to be able to vary the geometry of the turbocharger timely before a downshifting of the transmission the turbocharger control unit can be connected to a control unit of the transmission in order to receive signals from the latter, or it can be connected to a rotational speed sensor and a speedometer of the vehicle in order to automatically detect the presence of the conditions for a downshifting of the transmission. If the turbocharger control unit is able to detect the conditions for a downshifting it can practically also assume the function of a control unit for the transmission.

While the control unit, in the event that the rotational speed of the turbocharger is below the rotational speed limit value will practically downshift the transmission immediately when undershooting of the rotational speed limit value, it is preferentially provided in the event that the rotational speed is above the rotational speed limit value to initially vary the geometry of the turbocharger in the direction of a reduction of the rotational speed and only subsequently to downshift the transmission. In other words, when the turbocharger rotational speed is low enough the transmission is immediately shifted in the presence of the prerequisites for downshifting whereas when the turbocharger rotational speed is above the rotational speed limit value the downshifting of the transmission takes place with a delay in order to enable a rotational speed reduction of the turbocharger beforehand. The time delay between the varying of the turbocharger geometry and the downshifting of the transmission can be predetermined, preferentially as a function of ambient air pressure or the altitude above sea level, at which the vehicle is located.

Another possibility of preventing an exceeding of the maximum permissible turbocharger rotational speed is to have the control unit monitor an auxiliary shifting limit value if the rotational speed is above the rotational speed limit value, which auxiliary shifting limit value is higher than the actual shift limit value and to vary the geometry of the turbocharger in the direction of a reduction of the rotational speed already in the event of an undershooting of the auxiliary shifting limit value. Thus the rotational speed reduction of the turbocharger can already be completed when the rotational speed of the combustion engine reaches the actual shift limit value and downshifting can take place immediately.

A method is also provided for controlling a transmission and a turbocharger with variable geometry in a motor vehicle with the steps: deciding if downshifting of the transmission is necessary or not, once it has been decided that downshifting is necessary, varying of the geometry of the turbocharger in the direction of a reduction of its rotational speed prior to the downshifting.

A computer program product with program code is provided that enables a computer to operate as turbocharger control unit in a motor vehicle as described above or to carry out the method stated above and a machine-readable data carrier on which the program instructions are recorded, which enable a computer to operate as turbocharger control unit as described above or carry out the method described above.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
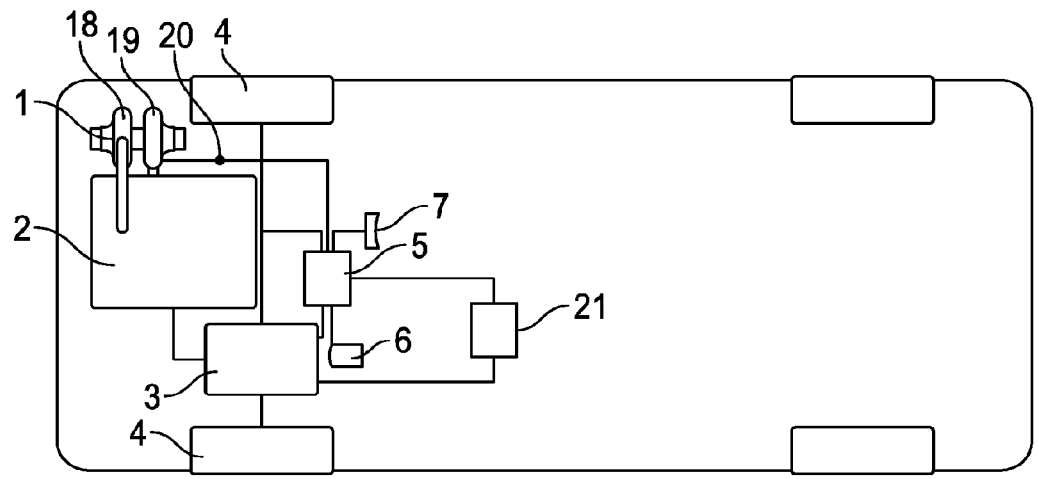
FIG. 1 a schematic representation of a motor vehicle according to an embodiment.

FIG. 1 is a schematic representation of a motor vehicle according to an embodiment. The motor vehicle includes a turbocharger 1 having a variable geometry. The turbocharger 1 includes a turbocharger compressor 18 and a turbocharger turbine 19. A speed sensor 20 is provided for detecting a rotational speed of the turbocharger turbine 19. The speed sensor can be part of the turbocharger 1 or a separate component that is coupled to the turbocharger 1. The turbocharger turbine 19 has variable turbine blades that are configured to be adjusted to vary a variable geometry of the turbocharger 1 and adjust a gas flow. The turbocharger compressor 18 of the turbocharger 1 supplies the combustion engine 2 with precompressed combustion air. The combustion engine 2 drives the wheels 4 of the vehicle via an automatic transmission 3.

A microprocessor-based electronic control unit includes a turbocharger control unit 5 that is connected to an accelerator pedal 6 in order to control the fuel proportioning to the combustion engine 2 and the position of the blades in a turbine of the turbocharger 1 in accordance with the position of the accelerator pedal 6. The control unit 5 in the figure is also shown connected to the automatic transmission 3 and equipped to control the respective gear engaged in the automatic transmission 3. In addition, the control unit 5 in this case is connected to an ambient pressure sensor 7 which allows it to evaluate the density of the combustion air sucked in by the turbocharger 1. Alternatively, a receiver for GPS or similar navigation systems could be considered as a means for estimating the ambient air pressure which is equipped by means of the signals received to calculate the altitude of the vehicle above sea level and to calculate or read off a table the air pressure by means of this altitude.

Figure 2:
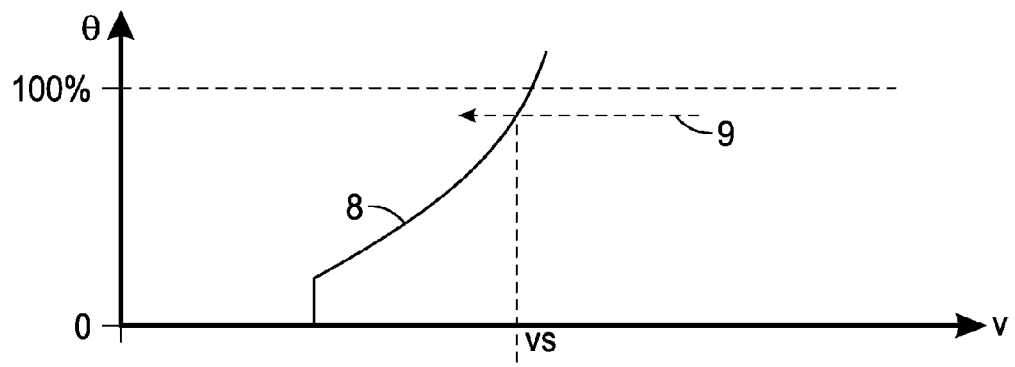
FIG. 2 diagrams which illustrate the conditions for a downshifting and the carrying out of the downshifting operation according to a first embodiment.
Figure 2:
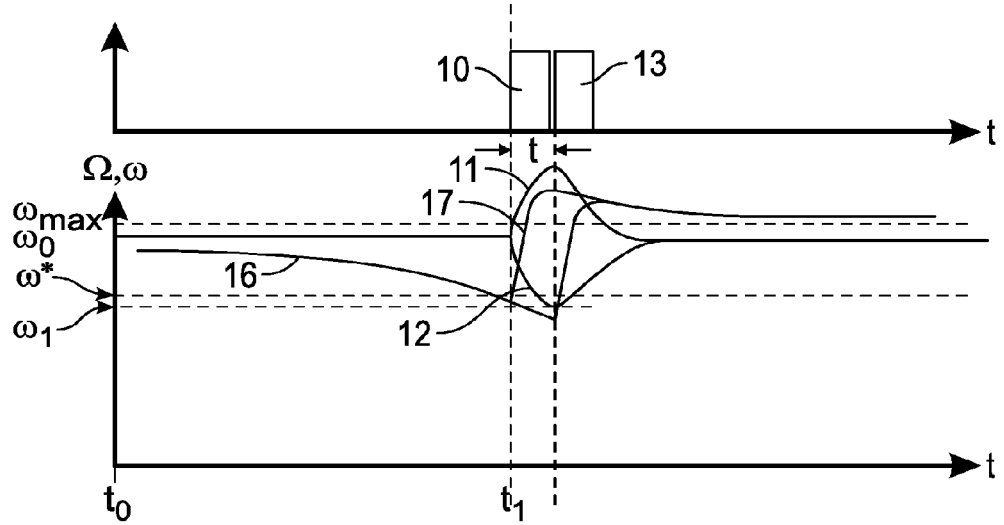

The control unit 5 determines the respective gear engaged in the automatic transmission 3 as a function of the vehicle speed and the position of the accelerator pedal 6. The upper most of the three diagrams of FIG. 2 shows a typical curve of a downshift threshold 8, for example for a downshifting from the third into the second gear, in a two-dimensional diagram on the horizontal axis of which the vehicle speed v and on the vertical axis of which the position θ of the accelerator pedal are plotted. Upon slight actuation of the accelerator pedal 6 the limit speed, undershooting of which leads to downshifting, is independent of the accelerator pedal position. Upon stronger accelerator pedal actuation this limit speed gradually increases. An arrow 9 designates the working point shift of a motor vehicle which gradually slows down under high load for example when with hitched-up trailer it drives up a slope. The accelerator pedal 6 in this case is almost 100% actuated. The arrow 9 crosses the downshift threshold 8 at the limit speed vs. When the speed of the vehicle has decreased to the value versus the control unit 5 consequently detects that a downshifting from the third into the second gear is required. This slowing-down of the vehicle in the lowermost diagram of FIG. 2 corresponds to a continuous decrease of the rotational speed $\Omega$ of the combustion engine 2 in a time interval from t0 to t1, represented by a curve 16.

A control unit 21 for the automatic transmission 3 (that is different than the turbocharger control unit 5 of FIG. 1 the foregoing embodiment) would, when undershooting the limit speed versus at the time $t_1$ immediately send a downshift command 10, represented as dotted rectangle in the second part diagram of FIG. 2 to actuators of the automatic transmission 3. The downshifting leads to a sudden increase of the rotational speed $\Omega$ of the combustion engine 2, represented by a dotted curve 17 in the third part diagram and consequently also of the air throughput of the combustion engine 2, and the increased exhaust gas output in turn accelerates the turbocharger 1. If the rotational speed $\omega_0$ of said turbocharger was close on the permissible maximum rotational speed $\omega_{max}$ prior to downshifting because of the high load, this permissible maximum rotational speed $\omega_{max}$ is exceeded through the downshifting, as is represented by a dotted curve 11 in the third part diagram of FIG. 2.

By contrast, the control unit 5 reacts to the undershooting of the limit speed versus, in the event that the rotational speed ω of the turbocharger 1 is above a limit value ω* at the same time, at the time t1 initially through an adjustment of the turbine blades in the turbocharger 1. This adjustment leads to a reduction of the rotational speed (0 of the turbocharger 1, as is represented in the third part diagram by a continuous curve 12. The time required by the turbocharger 1 to reach a new stationary rotational speed is conditional on the design and known. Just before the expiration of this time with a time offset Δt relative to the undershooting of the limit speed versus, the control unit 21 at the time $t_2$ sends a downshift command 13 to the automatic transmission 3. In other words, the control unit 21 sends the downshift command 13 to the automatic transmission 3 after the variable turbine blades have been adjusted. Here, too, the downshifting leads to an acceleration of the turbocharger 1, but since this acceleration is superimposed by the slowing-down caused through the adjustment of the turbine blades the rotational speed increase is slower than in the case of curve 11, and since compared with $\omega_0$ it is based on a lower initial value $\omega_1$, the stationary rotational speed of the turbocharger 1 materializing following the shifting is also lower. Practically, the extent of the blade adjustment in each case is predetermined so that following the downshifting the same rotational speed $\omega_0$ of the turbine as before is reestablished.

The difference between the limit value ω* and the permissible maximum rotational speed $\omega_{max}$ of the turbocharger 1 is at least as large as the fluctuation width of the rotational speed upon downshifting, i.e., as the difference between $\omega_0$ and the extreme values of the curves 11 or 12.

Figure 3:
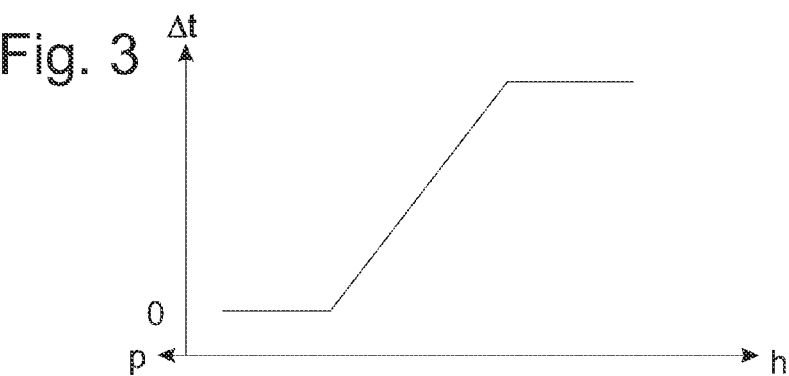
FIG. 3 a diagram representing the relationship between air pressure or altitude above sea level and downshift time delay.

The speed with which the speed ω of the turbocharger 1 changes following a blade adjustment depends on the performance which the turbocharger 1 continuously generates for the combustion engine 2 when compressing the combustion air. If for the sake of simplicity it is assumed that each revolution of the turbocharger compresses a same air volume by a same predetermined factor one can see that this performance has to be proportional to the starting pressure of the combustion air, i.e. proportional to the ambient air pressure. While the vehicle moves at low altitude above sea level the compression performance can be so high that the rotational speed increase represented by the curve 11 is suppressed or reduced to such a dimension that exceeding of $\omega_{max}$ does not occur. In this case, $\Delta t$ can be set equal to zero. The lower the ambient air pressure is, the smaller is its delaying effect on the turbocharger 1 and the greater is the time delay $\Delta t$ which is required between an adjusting of the turbine blades and the downshifting in order to prevent exceeding of $\omega_{max}$. FIG. 3 explains this fact by means of a curve 14, representing the relationship between ambient air pressure p (or altitude h of the vehicle above sea level) and the delay $\Delta t$. In a left region of the diagram, at high pressure p or low altitude h, the delay $\Delta t$ is constantly zero; in a middle pressure or altitude range it increases linearly with decreasing pressure or increasing altitude in order to finally at great altitude h or at low ambient pressure p re-assumes a constant value.

Figure 4:
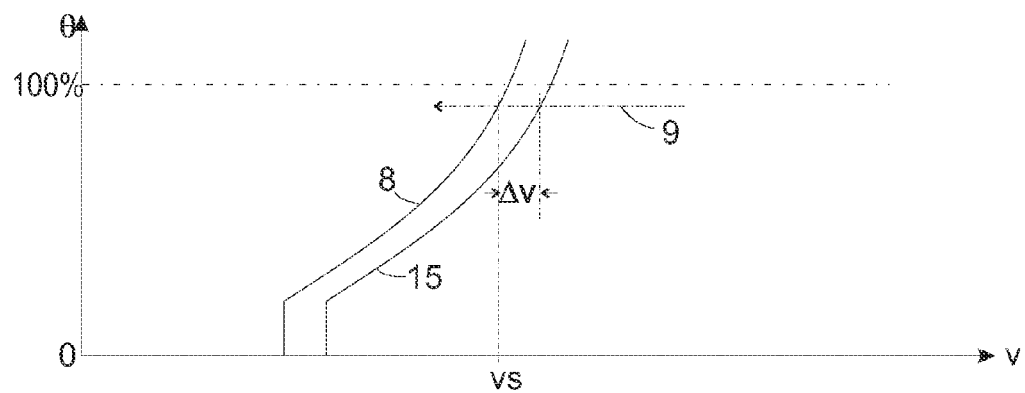
FIG. 4 a diagram analogous to a part diagram of FIG. 2 to illustrate the monitoring of the downshift condition according to a second embodiment.

FIG. 4 shows a second embodiment by means of a diagram that is analogous to the first part diagram of FIG. 2. On the axes of the diagram the vehicle speed v and the accelerator pedal position θ are again plotted. The downshift threshold 8 is the same as in FIG. 2. Adjacent to this, shifted to higher speeds, an auxiliary shifting threshold 15 is drawn in. If in the exemplary situation of a vehicle driving up a slope with hitched-up trailer considered in connection with FIG. 2 the speed of v of said vehicle decreases, the arrow 9 initially crosses the auxiliary shifting threshold 15. When this occurs, the control unit 5 initially adjusts the blades of the turbocharger 1 in order to reduce its speed ω. When the decrease of the vehicle speed v continues and the arrow 9 at the speed versus finally crosses the downshift threshold 8, the speed ω of the turbocharger 1 is already reduced so far that the automatic transmission 3 can be downshifted without delay.

If however following the crossing of the auxiliary shifting threshold 15 the speed v of the vehicle should rise again so that downshifting proves to be superfluous, the adjustment of the blades of the turbocharger 1 can be reversed again as soon as the working point of the vehicle in the diagram of FIG. 4 has crossed the auxiliary shifting threshold 15 in the direction of increasing speeds.

To ensure that between the crossing of the auxiliary shifting threshold 15 and the crossing of the downshift threshold 8 a time span $\Delta t$ that is adequate for the required rotational speed reduction of the turbocharger 1 is present, the control unit 5 monitors the acceleration a of the vehicle, be it by means of an acceleration sensor or by inferring the speedometer signal after the time. The speed difference $\Delta v$ between the thresholds 8, 15 is re-established dynamically according to $\Delta v = a \Delta t$, wherein $\Delta t$ is the air pressure or altitude-dependent deceleration explained above with reference to FIG. 3. In other words: while the position of the downshift threshold 8 for each pair of gears of the automatic transmission 3 is predetermined in a fixed manner and invariable, the position of the auxiliary shifting threshold 15 is newly established as required, particularly with each significant change of the acceleration a.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for controlling an automatic transmission and a turbocharger with variable geometry in a motor vehicle via a turbocharger control unit of an electronic control unit, wherein the turbocharger comprises a turbocharger compressor that supplies pre-compressed combustion air to the combustion engine, a turbocharger turbine having variable turbine blades to adjust a gas flow, and a speed sensor for detecting a rotational speed of the turbocharger, the method comprising:
   determining, at the turbocharger control unit, whether the automatic transmission is to be downshifted;
   before the automatic transmission is to be downshifted, adjusting the variable turbine blades to reduce the rotational speed of the turbocharger and thereby avoid overspeed of the turbocharger.

2. The method according to claim 1, further comprising: monitoring the rotational speed of the turbocharger; and
   wherein adjusting further comprises:
      adjusting the turbine blades to vary the variable geometry to reduce the rotational speed only when the rotational speed is above a rotational speed limit value.

3. The method according to claim 1, further comprising: monitoring a speed of the motor vehicle for undershooting of a downshift threshold for downshifting.

4. The method according to claim 1, further comprising: monitoring the rotational speed of a combustion engine for undershooting of a downshift threshold for downshifting.

5. The method according to claim 2, further comprising: adjusting the turbine blades to vary the variable geometry of the turbocharger to reduce the rotational speed and subsequently downshifting the transmission upon undershooting of a shifting limit value and in the event that the rotational speed is above the rotational speed limit value; and
   downshifting the transmission if the rotational speed is below the rotational speed limit value.

6. The method according to claim 1, further comprising: downshifting the transmission in each case with a predetermined time delay after adjusting the turbine blades to vary the variable geometry.

7. The method according to claim 6, wherein the predetermined time delay between adjusting the turbine blades to vary the variable geometry and sending the downshift command is predetermined as a function of ambient air pressure.

8. The method according to claim 6, wherein the predetermined time delay between adjusting the turbine blades to vary the variable geometry and sending the downshift command is predetermined as a function of altitude above sea level.

9. The method according to claim 5, further comprising: if the rotational speed is above the rotational speed limit value, monitoring an auxiliary shifting limit value and in the event of undershooting of the auxiliary shifting limit value, adjusting the turbine blades to vary the variable geometry of the turbocharger to reduce the rotational speed.

10. A motor vehicle, comprising:
   a combustion engine;
   an automatic transmission;
   a turbocharger having a variable geometry, the turbocharger comprising:
   a turbocharger compressor for pre-compressing combustion air supplied to the combustion engine; and
   a turbocharger turbine having variable turbine blades that are configured to be adjusted to vary the variable geometry of the turbocharger and thereby adjust a gas flow; and
   a speed sensor for detecting a rotational speed of the turbocharger;

an electronic control unit including a turbocharger control unit configured to:
   determine whether the automatic transmission is to be downshifted; and
   adjust the variable turbine blades, before the automatic transmission is to be downshifted, to reduce the rotational speed of the turbocharger and thereby avoid an overspeed of the turbocharger.

11. The motor vehicle according to claim 10, wherein the turbocharger control unit is further configured to:
   monitor the rotational speed of the turbocharger; and
   adjust the turbine blades to vary the variable geometry of the turbocharger to reduce the rotational speed of the turbocharger only when the rotational speed of the turbocharger is above a rotational speed limit value.

12. The motor vehicle according to claim 10, wherein the turbocharger control unit is further configured to:
   simultaneously operate as a control unit for the automatic transmission.

13. The motor vehicle according to claim 11, wherein the turbocharger control unit is configured to:
   monitor a speed of the motor vehicle for undershooting of a downshift threshold for downshifting.

14. The motor vehicle according to claim 10, wherein the turbocharger control unit is configured to:
   monitor the rotational speed of the combustion engine for undershooting of a downshift threshold for downshifting.

15. The motor vehicle according to claim 13, wherein the turbocharger control unit is further configured to:
   upon undershooting of the downshift threshold for downshifting and in the event that the rotational speed is above the rotational speed limit value, initially adjust the turbine blades to vary the variable geometry of the turbocharger to reduce the rotational speed of the turbocharger and subsequently downshift the automatic transmission; and
   if the rotational speed of the turbocharger is below the rotational speed limit value, downshift the automatic transmission.

16. The motor vehicle according to claim 10, wherein the turbocharger control unit is further configured to:
   downshift the automatic transmission in each case with a predetermined time delay after adjusting the turbine blades to vary the variable geometry.

17. The motor vehicle according to claim 16, wherein the predetermined time delay between the varying of the variable geometry and sending the downshift command is predetermined as a function of ambient air pressure.

18. The motor vehicle according to claim 16, wherein the predetermined time delay between the varying of the variable geometry and sending the downshift command is predetermined as a function of altitude above sea level.

19. The motor vehicle according to claim 13, wherein the turbocharger control unit is configured to:
   if the rotational speed of the turbocharger is above the rotational speed limit value, monitor an auxiliary shifting limit value and in event of undershooting of the auxiliary shifting limit value to adjust the turbine blades to vary the variable geometry of the turbocharger to reduce the rotational speed of the turbocharger.

20. The motor vehicle according to claim 19, wherein a difference between the downshift threshold for downshifting and the auxiliary shifting limit value is predetermined as a function of an ambient air pressure.

* * * * *